BEST AVAILABLE COP

United States Patent [19]

Ducharme

[11] Patent Number: 4,910,038
[45] Date of Patent: Mar. 20, 1990

[54] PET FOOD AND METHOD OF PREPARATION

[75] Inventor: Cyril L. Ducharme, Long Lake, Minn.

[73] Assignee: Huntington Hyde Ltd., Inc., Minneapolis, Minn.

[21] Appl. No.: 299,224

[22] Filed: Jan. 23, 1989

[51] Int. Cl.⁴ ............................................. A23K 1/00
[52] U.S. Cl. ................................. 426/641; 426/513; 426/516; 426/520; 426/623; 426/630; 426/644; 426/646; 426/647
[58] Field of Search ............... 426/644, 641, 646, 647, 426/802, 805, 448, 516, 623, 630, 513, 520

[56] References Cited

U.S. PATENT DOCUMENTS

| | | | |
|---|---|---|---|
| 4,054,674 | 10/1977 | Barker et al. | 426/805 |
| 4,143,168 | 3/1979 | Bernotavicz | 426/805 |
| 4,190,679 | 2/1980 | Coffee et al. | 426/805 |
| 4,239,785 | 12/1980 | Roth | 426/646 |
| 4,310,558 | 1/1982 | Nahm | 426/805 |
| 4,419,372 | 12/1983 | Greene et al. | 426/805 |
| 4,702,929 | 10/1987 | Lehn et al. | 426/805 |

*Primary Examiner*—R. B. Penland
*Attorney, Agent, or Firm*—John A. O'Toole

[57] ABSTRACT

Disclosed are high meat content jerky-type pet treats and their methods of preparation. The present pet jerky treats provide product quality attributes of conventionally prepared jerky treats but with substantial cost savings. The present method involves a multi-step extrusion cooking process of major amounts involving aqueous dispersions of animal meats, soy meal, farinacious material, and minor amounts of salts, humectants, and flavorants.

10 Claims, No Drawings

PET FOOD AND METHOD OF PREPARATION

BACKGROUND

1. Field of the Invention

The present invention relates to pet foods and to their methods of preparation. More particularly, the present invention relates to dried, shelf stable, high meat content jerky pet treats and to their extruder cooking methods of preparation.

2. Background of the Invention

Pet foods generally fall into four classes. First are the low moisture containing animal foods, i.e., animal foods containing less than about 15% by weight moisture, which are known as the dry pet foods and which are shelf stable because the water activity (0.2 to 0.4) therein does not lend itself to mold and bacterial growth. These products need not be aseptically canned or preserved since they are stable by their chemical characteristics. Typically, these products comprise extruder cooked, expanded cereal compositions occasionally containing meat by-products primarily for flavoring.

Second are the high moisture containing pet foods, i.e., having about 85% by weight moisture, and which require aseptic canning for preservation. These are the well known canned pet foods.

Third, in recent years the pet food industry has moved toward the very popular semi-moist or intermediate moisture pet foods. These pet foods are intermediate in moisture having a moisture content of from about 20% to 40%. The products are intended, generally, to resemble fresh meat or cooked meat. Thus, the products are generally characterized by a soft, crumbly texture and densities comparable to meat. While their moisture content would normally render the product susceptible to mold and bacterial growth, these products have been rendered stable by inclusion of various acids and solutes thereby altering the pH and also decreasing the water activity ("$A_w$") to a level which prevents mold and bacterial growth. Beginning with the Burgess patent, U.S. Pat. No. 3,202,514, the pet food industry has developed a multitude of methods for making semi-moist food products and rendering them stable against mold and bacterial growth. Generally, however, these products have always utilized a pH control and solute content in order to provide a critical acidity and water activity and thereby discourage mold and bacterial growth.

The fourth category of pet foods are meat treats. Meat treats for pets are well known pet food items. Pet dry meat treats or "pet jerky" are distinguished from conventional dry pet foods both compositionally and in method of preparation. Pet jerky products are conventionally prepared in a process comparable to jerky preparations for human consumption although cheaper grade meat starting materials are employed. Typically, various meat materials are first ground and admixed with spice blends and preservatives. The blends are then formed into extrudate ropes using a common forming extruder without cooking the meat. Thereafter, the meat ropes are racked and smoked for about two to eight hours. Since the starting mixtures are high in moisture, after smoking, the product yields typically range from about 40% to 45%. The resulting pet jerky products are then cut into pieces and packaged for room temperature distribution. The products are chewy, low intermediate moisture and relatively dense compared to conventional dry dog foods or even to semi-moist pet foods. These products exhibit shelf stability due to low $A_w$'s resulting from the reduced moisture content as the products dry during the smoking/drying step. Better meat treats are characterized by shelf stability, high meat content (i.e., 60% to 80%), high cost, and good texture, i.e., soft and pliable yet cohesive.

While popular, pet jerky meat treats are not without disadvantages. The principle disadvantage with pet jerky treats is their relatively high cost. Their high cost results primarily from their high ingredient cost, the reduction in yields due to moisture loss and from their labor intensive, long drying (i.e., high energy consumptive) methods of preparation and in order for treats to be both shelf stable and flexible or chewy, frequently the products must be made quite thin or in relatively small pieces.

Given the state of the pet food art, there is a continuing need for new and useful pet jerky treat products of good quality and reduced cost. Surprisingly, the present invention overcomes disadvantages of the prior art and provides good quality jerky meat treats of high meat content but low cost. In its method aspect, the present invention provides simplified and inexpensive methods for preparing such products. Furthermore, the present invention provides a use for low value, underutilized animal carcass processing, waste materials and thereby converts a material characterized by difficult disposal problems into a valuable raw material.

SUMMARY OF THE INVENTION

In its composition and article aspects, the present invention resides in the discovery of high meat content, high solids content, dense, shelf stable jerky meat pet treats. Surprisingly, although high in quality and meat content, the present pet meat treat compositions are low in cost.

In its method aspect, the present invention resides in a multistep extrusion cooking process for the preparation of the present pet jerky treats. The present methods avoid the expensive handling and drying steps typically employed in the prior art in the preparation of prior products.

The present methods essentially comprise a first extrusion cooking step of a defined blend of (1) an aqueous dispersion of meat material such as comminuted animal offal, (2) soy meal, (3) a farinaceous material and (4) dried meat by-products. The mixture is then mechanically worked under temperatures, pressures and residence times to convert the mixture into a flaky, granular first pass meal.

In the second step, the first pass meal is combined with (1) additional amounts of aqueous meat product dispersion and (2) additional farinaceous material and mechanically worked in a second step at slightly milder conditions to form a second pass meal.

Thereafter, the second pass meal is combined with a humectant and hydrophillic binder and subjected to a third mechanically working step to form a third pass extrudate. The third pass extrudate is formed while still warm into desirably shaped and sized pieces of desired final moisture content without a final drying step.

DETAILED DESCRIPTION OF THE INVENTION

In its method aspect, the present invention resides in improved, inexpensive multiple step extrusion cooking methods of processing meat, meat by-products, soybean meal, and cereal mixtures which comprise defined multiple extrusion cooking passes to provide high meat content pet jerky treats without drying.

In its composition and article aspects, the present invention provides such high meat content pet jerky treats which are additionally characterized by shelf stability and flexibility.

Each of these processing steps, conditions, composition components and product attributes are described in detail below.

Throughout the specification and claims, percentages are by weight, pressures in pounds per square inch gauge and temperatures in degrees Fahrenheit unless otherwise indicated.

Desirably, the starting mixture for the first extrusion cooking step comprises a first aqueous dispersion of animal meat solids. Generally, such meat dispersions are obtained from slaughter houses such as for beef, pork, poultry or fish and mixtures thereof and is sometimes referred to as tankage. Tankage generally comprises comminuted or less desirable or low value animal products including trimmings, lungs, kidney and other organs (but excluding offal), high cost 3-D meat and mixtures thereof. Indeed, tankage disposal often presents difficulties. Tankage is typically described by its component specifications of protein, fat and total solids content. A typical tankage specification would comprise 10% to 15% protein, 15% to 25% fat and 30% to 45% (preferably 35%) total meat solids although various specifications of tankage can be used. Generally, however, higher total solids content tankages are preferred. Importantly, the tankage comprises raw or uncooked meat solids. The first mixture can comprise about 25% to 35% tankage, preferably about 28% to 30% and for best results about 30%.

The first mixture can further desirably comprise about 5% to 40% poultry meal. Poultry meal is a by-product of poultry processing and is desirable due to its high protein content at low cost. Poultry meal generally comprises dried ground necks and backs excluding offal. In preferred embodiments, the poultry meal can comprise about 30% to 35% of the mixture while for best results the poultry meal comprises about 35%.

Still another essential component of the first mixture is soy flour, i.e., defatted soy meal. Soy flour is an inexpensive source of high quality protein. While soy flour is preferred for use herein due to its low cost, other defatted soy fractions can also be employed in full or partial substitution for the soy flour. The first mixture can comprise about 10% to 20% soy flour. Preferably, soy flour comprises about 12% to 18% of the first mixture. For best results, the soy flour should comprise about 15% of the first mixture.

Still another important ingredient is a farinaceous material or cereal filler. While flours of various grains can be employed, it has been found that a convenient, inexpensive, useful, farinaceous material is bakery offal blend. Bakery offal blend is a dried, ground meal comprising bakery wastes. Such wastes can comprise unused dough, stale bread ends or crumbs, or other stale bakery items, unused portions of bakery mixes, and the like. The first mix can comprise about 10% to 20% of the farinaceous material. For better results, the first mix can comprise about 12% to 18% of the farinaceous material. While for best results, the first blend should comprise 15% of the farinaceous material.

The first mix can also optionally include about 0.1% to 10% spray dried cattle blood meal. Blood meal addition will also provide flavor and color characteristics to the present treats that pets find appealing. Furthermore, the spray dried blood meal is also high in animal protein. Spray dried blood is desired because it does not have the odor problems associated with pool dried blood. It is also for odor considerations that cattle blood is selected and other blood meals, e.g., poultry, are not suitable. For better results, the first mix can comprise about 5% spray dried cattle blood meal.

The first mixture can optionally include certain additional materials useful as fillers. Exemplary useful materials include sugar, nonfat dry milk solids, dried whey solids, and mixtures thereof. If used, the filler can comprise from about 0.1% to 40% of the first mix, preferably about 5% to 10%. While useful, these filler materials frequently are more expensive on a solids basis than other materials. Use thereof therefore reduces modestly the substantial cost advantages of the present invention.

Of course, the first mixture can optionally include a number of adjuvant materials to improve the nutrition, flavor, color or stability of the present jerky treat products. Such adjuvant materials can include, for example, salt, vitamins, preservatives, (e.g., potassium sorbate) flavors and the like. If present, each of these materials can comprise from about 0.1% to 4%, preferably about 0.1% to 2.5% of the first mixture.

Optionally, the first mix can comprise about 0.1% to 4% salt, preferably about 0.5%. In more preferred embodiments the salt comprises a blend of sodium chloride and potassium chloride. The potassium chloride is desired for mold inhibition. While not essential, it is desirable that the sodium chloride to potassium chloride have a weight ratio of about 3:1 for good salt blend balance characteristics.

The first mixture as described above desirably has a total solids content of about 78% to 85%, preferably about 80% to 85% and for best results about 82%. Provision of mixtures with the present sufficient solids levels are important in order to be able to extrusion cook process the mixtures.

The first mixture is mechanically worked at elevated temperatures and pressures to cook the meat and to work the mixture into an homogeneous mass. Preferred for use herein are extruder cookers. Such extruders are well known in the pet food art and preferred for use herein are single screw, short barrel extruders although other cooker extruder types can be employed, such as twin screw or long barrel sage screw (e.g., Wenger Manufacturing Co.). In the preferred embodiments, the extruder is operated at barrel temperatures ranging from 260° F. (127° C.) to 280° F. (138° C.) and pressures of 450 to 550 psig (3 to 3.75 MPa.). Typical extruder residence times are short, ranging from about 20 to 30 seconds and are primarily a dependent processing variable of barrel temperature. As the first mixture exist to atmospheric pressure the extrudate experiences about a 10% moisture blow-off loss and very modest expansion if any, i.e., generally less than about 10% expansion. The first pass extrudate is in the form of a cooked meal, i.e., is in the form of a flaky, granular material having a moisture content of about 8% to 15% and wherein the meat fraction is cooked, i.e., the protein is denatured and wherein the starch components are gelatinized but preferably not fully gelatinized.

Thereafter, the first pass meal prepared as above is combined with additional ingredients to form a second mixture. The second mixture essentially comprises about 50% to 70% of the first pass meal prepared as described above, preferably about 50% to 65% and for best results about 60%. The second mixture further essentially comprises about 10% to 20% of additional farinaceous material, preferably about 12% to 18% and for best results about 15%. In the second mixture, however, preferably the material is flour due to its bland flavor, especially wheat flour although corn flour and other flours can be used as well as other flour fractions. Flours or other ungelatinized starch materials are preferred due to their binding capabilities as compared woith bakery offal. Additionally, the second mixture further essentially comprises about 20% to 30% additional aqueous meat dispersion or tankage, preferably about 22% to 28% and for best results about 25% tankage.

The second mixture desirably has a total slids content ranging from about 75% to 90%, preferably about 80% to 85% and for best results about 80%.

The second mixture so formulated is then mechanically worked or extruder cooked in a second extruder cook step in a manner similar to the first extruder cooking step except that the operating temperatures are reduced slightly so as to avoid full starch gelatinization. Good results can be obtained with barrel temperatures ranging from 245° F. to 260° F. (118° C. to 126° C.). Better results are obtained with temperatures ranging from about 245° F. to 255° F. and for best results about 250° F. (121° C.). Operating pressures can range from about 475 to 525 psig. Residence times are comparable to the first extruder cook step, namely, about 20 to 30 seconds.

The second mixture is cooked as well as mechanically worked and formed into a flowable, extrudable mass, and exits the extruder to the atmosphere. Again, the material exhibits a modest blow-off moisture loss, e.g., about 5%. The par-cooked second pass meal so prepared also appears similar to the first pass meal in that it is a flake or granular material although the second pass meal is darker in appearance. The second pass meal has a moisture content of about 16% to 18%.

Thereafter, in the most preferred embodiment of the present invention, the second pass meal material is then combined with minor amounts of additional ingredients to form a third mixture. In this embodiment, the third mixture essentially comprises about 92% to 96% of the third mixture of the second pass meal, preferably about 94% to 96% and for best results about 94%. The third mixture further essentially comprises about 1% to 8% of a humectant such as propylene glycol, glycerol, sorbitol, and mixtures thereof, preferably about 2% to 6% and for best results about 4%.

Optionally, the third mixture can additionally further comprise other or additional amounts of the adjuvants described above. Addition to the third mixture is especially desirable for heat sensitive or volatile materials.

In even more preferred embodiments the third mixture comprises minor amounts of a hydrophillic binder such as carboxymethyl cellulose, Irish moss, guar, xanthan, locust bean, carrageenan, and mixtures thereof in amounts effective to further bind the moisture content and thereby to assist in the provision of microbial stability. Useful amounts range from about 0.01% to 0.5% of the third mixture.

The third mixture is then mechanically worked or extruder cooked at even milder conditions than the previous extrusion cook steps. Useful barrel temperatures range from 200° F. to 220° F., (93.3° C. to 104.4° C.) preferably 205° F. to 210° F. (96.1° C. to 98.8° C.) and pressures ranging from 475 to 500 psig (3.23 to 3.4 MPa.). Residence times range from about 20 to 30 seconds.

The third pass extrudate so prepared exists the extruder to atmosphere in the form of a heavy, unexpanded plastic mass in contrast to the mealy intermediate products of the prior extrusion cook steps. The fully cooked third pass extrudate is extruded through the extruder die orifice and is brought, while still warm, into a means for shaping the extrudate into desired shapes, such as a forming roller or flaking roll or sheeting roll for forming the extrudate into a ribbon of suitable width and thickness, e.g., about 2 to 6 mm. The ribbon is then cut into segments of desired length and is allowed to come to ambient temperature. In another shape, the products can be formed into tubes or ropes with or without casein skins. Thereafter, the finished product of the present invention is conventionally packaged without further drying.

The finished product of the present invention is characterized by a meat content of about 40% to 55%, preferably 45% to 55%, and for best results about 50%, a total solids content of about 85% and a water activity of about 0.5. The jerky pet treats so prepared are additionally characterized by being relatively soft and chewy but having a jerky like texture. In general appeal to pets, the present jerky treats exhibit comparable desirability compared to the more expensive jerky treats prepared by conventional prior art methods in formulations therefor. In contrast to certain of the products of the prior art, the present products have a more neutral pH, i.e., about pH 4.3, and are further characterized by low levels of water activity controlling molecular weight solutes, i.e., typically less than 10% and preferably less than about 4%.

In an alternate embodiment of the present invention, the third pass extrusion cook step is substituted with alternate steps. In this embodiment, various shaped articles can be prepared. In this embodiment the second pass meal is employed, although the second pass meal itself cannot be formed conventionally into shaped articles. The second pass meal is next firstly combined with sufficient amounts of water or high moisture sources (e.g., off specification milk) to bring the moisture content up to about 50% by weight. The resulting mixture resembles a pate'. The mixture is then fed to a low pressure extruder, e.g., sausage stuffer, which then feeds the extrudate into forming horns or dies to form into novelty shapes.

In another variation, the composition can be fed to coextruders wherein hydrated mixtures varying in color, flavor, etc. are co-extruded into an exterior core or shell of one color flavor, etc. and an interior or core portion such as to simulate a round filled bone.

The extrudate or co-extrusion extrudate is then sliced into appropriately sized pieces and conventionally forced hot air convection dried to a moisture content of about 15% by weight in order to assure shelf stability. Surprisingly, drying times are relatively short, typically 20 to 40 minutes rather than the several hours cook and dry times required by prior art processes. While not wishing to be bound by the proposed theory, it is believed that the reduced drying times are due to the phenomenon that added water is more easily removed than interstitial or intracellular moisture associated with uncooked meat emulsions.

Industrial Applicability

The present invention finds particular suitability in the commercial preparation of pet foods, particularly high meat content jerky pet treats and other high meat content per treats. The present invention provides high volume, low cost convenient methods for the preparation of such products. In particular, the present invention avoids expensive handling, and the high energy consumptive, high capital cost extended drying steps of the prior art.

EXAMPLE 1

A jerky meat treat of the present invention was prepared according to the following process.

The following ingredients are first combined in a 250 gallon paddle style mixer. (Any suitable mixer may be employed.)

| Ingredients | Pounds | % 1st Run |
|---|---|---|
| Wet Beef Waste (tankage) | 300 | 29.09 |
| High Protein Poultry Meal | 300 | 29.09 |
| 48% Protein Soy Flour | 150 | 14.56 |
| Bakery Blend | 200 | 19.39 |
| Spray Dried Beef Blood Meal | 50 | 4.86 |
| Potassium Sorbate | 6 | 0.59 |
| Potassium Chloride | 5 | 0.48 |
| Salt | 20 | 1.94 |
| Total | 1,031 | 100.00 |

The above ingredients are blended in a paddle mixer (or other suitable mixer) for 15 minutes or until thoroughly blended. The resulting mixture is then passed through a short barreled extruder at a barrel pressure of apx. 500 psi with a barrel temperature of apx. 270° F. The residence time in the extruder barrel is about 26-28 seconds. The resulting "high protein meat flour" or first pass meal so prepared is then used to produce the second pass material.

The following ingredients are combined in a 250 gallon paddle mixer. (Again, any suitable mixer may be employed.)

| Ingredients | Pounds | % 2nd Run |
|---|---|---|
| 1st Run Product | 927 | 58.96 |
| Wet Beef Waste | 420 | 26.73 |
| Wheat Flour | 225 | 14.31 |
| Total | 1,582 | 100.00 |

The above ingredients are blended in a paddle mixer (or other suitable mixer) for 15 minutes or until thoroughly blended. The resulting mixture is then passed through a short barreled extruder at a barrel pressure of apx. 500 psi with a barrel temperature of apx. 250° F. The residence time in the extruder barrel is about 26 seconds. The yield is about 1500 lbs. The resulting mixture, "high protein meat second pass meal" is then used in one of two manners:

(A) The second pass meal so produced is blended with the following ingredients for 15 minutes or until thoroughly blended:

| Ingredients | Pounds | Percent |
|---|---|---|
| 2nd Pass Product | 1,500 | 93.92 |
| Propylene Glycol | 65 | 4.07 |
| Liquid Smoke Flavor | 15 | 0.94 |
| Carboxymethylcellulose Binder | 2 | 0.13 |
| Spices | 15 | 0.94 |
| Total | 1,597 | 100.00 |

The resulting mixture is then formed into a desired shape by extruding it through a short barreled extruder and forming the extrudent while still warm with a flaking roller or other forming device to prepare the jerky meat treats of the present invention. The treats have a meat content of about 48% and a moisture conent of about 18%. The jerky meat treats are then conventionally packaged for shelf stable storage.

(B) The second pass is combined with the ingredients in "A", but to this mixture, is added 30% (480 lbs) of water. After thoroughly blending, the mixture is formed using a low pressure extruder to the desired shape and may be colored as desired. These shaped articles are then dried by conventional forced hot air convection drying at 180° F. for about 35 minutes to form shelf stable jerky treat articles of a moisture content of about 14% by weight.

Additional material of two different colors may be used (co-extruded) so as to produce products that would simulate animal bones, hot dogs, etc.

I claim:

1. An inexpensive method of producing a pliable, unexpanded meat jerky pet food treat, comprising the steps of:
   A. mechanically working a first mixture comprising
      1. about 25% to 35% of the first mixture of a first aqueous dispersion of animal meat solids comprising about 30% to 40% solids,
      2. about 10% to 20% by weight of the first mixture of soy flour,
      3. about 10% to 20% by weight of the first mixture of a farinaceous material,
      4. about 5% to 40% by weight poultry meal, and
      5. about 0.1% to 10% dried blood meal,
      wherein the first mixture has a solids content of about 75% to 82% by weight of the first mixture,
      at conditions of elevated temperature above 212° F. and elevated pressure for a time sufficient to cook the mixture and to convert the mixture into a flowable substance, said flowable substance therein being extruded through a restricted orifice into a zone of lower pressure than the condition of elevated pressure causing moisture evaporation thereby forming a cooked first pass meal having a moisture content of about 8% to 15% by weight;
   B. mechanically working a second mixture comprising
      1. about 50% to 70% by weight of said second mixture of the first pass meal,
      2. about 10% to 20% by weight of said second mixture of a farinaceous material,
      3. about 20% to 30% by weight of said second mixture of a second aqueous dispersion of animal meat solids comprising about 30% to 40% solids and about 30% to 40% animal protein,
      wherein the second mixture has a solids content of about 75% to 90% by weight of the second mixture;

at conditions of elevated temperature above 212° F. and elevated pressure for a time sufficient to denature the animal protein, said mixture then being extruded through a restricted orifice into a zone of lower pressure than the condition of elevated pressure causing moisture evaporation to form an homogeneous cooked, second pass meal;

C. mechanically working a third mixture comprising
1. about 90% to 96% by weight of the third mixture of the second pass meal,
2. about 1% to 6% by weight of the blend of a humectant,
3. about 0.005% to 0.5% by weight of the blend of a hydrophilic binder at a temperature ranging from about 200° to 220° F. and at an elevated pressure for a time sufficient to convert the third mixture into a flowable substance, said flowable substance then being extruded through a restricted orifice into a zone of lower pressure than the condition of elevated pressure causing moisture evaporation to form a third pass extrudate in the form of a heavy plastic mass having a meat solids content of about 40% to 55% by weight;

D. forming the third pass extrudate into pieces of desired shape and size to form jerky meat treats.

2. The method of claim 1 wherein in step A the first mixture comprises
1. about 28% to 30% by weight of the first mixture of the aqueous dispersion of animal meat solids,
2. about 30% to 35% by weight of the first mixture of poultry meal,
3. about 12% to 18% by weight of the first mixture of soy flour,
4. about 12% to 18% by weight of the first mixture of the farinaceous material.

3. The method of claim 2 wherein in step A the first mixture additionally comprises
6. about 0.1% to 40% of a material selected from the group consisting of sugar, nonfat dry milk, dried whey solids, and mixtures thereof.

4. The method of claim 3 wherein in step B the second mixture comprises
1. about 50% to 65% by weight of the second mixture of the first pass meal,
2. about 12% to 18% by weight of the second mixture of an ungelatinized flour,
3. about 22% to 28% by weight of the second mixture of the second aqueous dispersion, wherein step D the forming step is practiced while the third pass extrudate is still warm.

5. The method of claim 4 wherein in step C the third pass material comprises
1. about 94% to 96% by weight of the blend of the second pass meal,
2. about 0.1% by weight of the blend of the hydrophillic binder,
3. about 2% to 6% by weight of the blend of a humectant selected from the group consisting of propylene glycol, glycerol, sorbitol and mixtures thereof.

6. An inexpensive method of producing a pliable, unexpanded meat jerky pet food treat, comprising the steps of:
A. mechanically working a first mixture comprising
1. about 25% to 35% of the first mixture of a first aqueous dispersion of animal meat solids comprising about 30% to 40% solids,
2. about 10% to 20% by weight of the first mixture of soy flour,
3. about 10% to 20% by weight of the first mixture of a farinacious material,
4. about 5% to 40% by weight poultry meal, and
5. about 0.1% to 10% dried blood meal,
wherein the first mixture has a solids content of about 75% to 82% by weight of the first mixture,
at conditions of elevated temperature about 212° F. and elevated pressure for a time sufficient to cook the mixture and to convert the mixture into a flowable substance, said flowable substance then being extruded through a restricted orifice into a zone of lower pressure than the condition of elevated pressure causing moisture evaporation thereby forming a cooked first pass meal having a moisture content of about 8% to 15% by weight;

B. mechanically working a second mixture comprising
1. about 50% to 70% by weight of said second mixture of the first pass meal,
2. about 10% to 20% by weight of said second mixture of a farinaceous material,
3. about 20% to 30% by weight of said second mixture of a second aqueous dispersion of animal meat solids comprising about 30% to 40% solids and about 30% to 40% animal protein,
wherein the second ixture has a solids content of about 75% to 90% by weight of the second mixture;
at conditions of elevated temperature above 212° F. and elevated pressure for a time sufficient to denature the animal protein of the animal meat solids, said mixture then being extruded through a restricted orifice into a zone of lower pressure than the condition of elevated pressure causing moisture evaporation to form an homogeneous cooked, second pass meal;

C. admixing the second pass meal and sufficient amounts of moisture to form an homogeneous paste having a moisture content of about 45% to 55% by weight;

D. forming the paste into pieces of desired shape and size to form formed wet pieces; and E. drying the formed wet pieces to a water activity of about 0.3 to 0.8 to form dried, formed pet meat treats.

7. The method of claim 6 wherein in step A the first mixture comprises
1. about 28% to 30% by weight of the first mixture of the aqueous dispersion of animal meat solids,
2. about 30% to 35% by weight of the first mixture of poultry meal,
3. about 12% to 18% by weight of the first mixture of soy flour,
4. about 12% to 18% by weight of the first mixture of the farinaceous material.

8. The method of claim 7 wherein in step A the first mixture additionally comprises
6. about 0.1% to 40% of a material selected from the group consisting of sugar, nonfat dry milk, dried whey solids, and mixtures thereof.

9. The method of claim 8 wherein in step B the second mixture comprises
1. about 50% to 65% by weight of the second mixture of the first pass meal, 2. about 12% to 18% by weight of the second mixture of an ungelatinized flour,
3. about 22% to 28% by weight of the second mixture of the aqueous meat solids dispersion.

10. The method of claim 9 wherein in step C the paste comprises 1. about 94% to 96% by weight of the paste of the second pass meal,
2. about 0.1% by weight of a paste of the hydrophillic binder,
3. about 2% to 6% by weight of the paste of a humectant selected from the group consisting of propylene glycol, glycerol, sorbitol and mixtures thereof.

* * * * *